United States Patent
Scherf et al.

(10) Patent No.: US 9,146,990 B2
(45) Date of Patent: Sep. 29, 2015

(54) SEARCH AND IDENTIFICATION OF VIDEO CONTENT

(71) Applicant: Gracenote, Inc., Emeryville, CA (US)

(72) Inventors: Steven D. Scherf, Fremont, CA (US); Wilson Harron, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 100 days.

(21) Appl. No.: 13/839,782

(22) Filed: Mar. 15, 2013

(65) Prior Publication Data

US 2014/0193027 A1    Jul. 10, 2014

Related U.S. Application Data

(60) Provisional application No. 61/749,819, filed on Jan. 7, 2013.

(51) Int. Cl.
*G06K 9/00* (2006.01)
*G06F 17/30* (2006.01)

(52) U.S. Cl.
CPC .............. *G06F 17/30784* (2013.01)

(58) Field of Classification Search
None
See application file for complete search history.

(56) References Cited

U.S. PATENT DOCUMENTS

| | | | | |
|---|---|---|---|---|
| 6,671,391 B1* | 12/2003 | Zhang et al. | | 382/118 |
| 8,027,565 B2* | 9/2011 | Zhang | | 386/241 |
| 8,094,872 B1* | 1/2012 | Yagnik et al. | | 382/100 |
| 8,184,953 B1* | 5/2012 | Covell et al. | | 386/248 |
| 8,259,177 B2* | 9/2012 | Gits et al. | | 348/169 |
| 8,433,175 B2* | 4/2013 | Shakya et al. | | 386/241 |
| 8,458,482 B2* | 6/2013 | Conwell | | 713/176 |
| 8,577,077 B2* | 11/2013 | Zhang | | 382/100 |
| 8,594,392 B2* | 11/2013 | Bilobrov | | 382/124 |
| 8,712,216 B1* | 4/2014 | Covell et al. | | 386/248 |
| 8,755,837 B2* | 6/2014 | Rhoads et al. | | 455/556.1 |
| 2009/0052784 A1* | 2/2009 | Covell et al. | | 382/209 |
| 2009/0290752 A1* | 11/2009 | Kalva | | 382/100 |
| 2009/0328125 A1* | 12/2009 | Gits et al. | | 725/118 |
| 2010/0306193 A1* | 12/2010 | Pereira et al. | | 707/728 |
| 2011/0116719 A1* | 5/2011 | Bilobrov | | 382/217 |
| 2012/0134548 A1* | 5/2012 | Rhoads et al. | | 382/118 |
| 2012/0224743 A1* | 9/2012 | Rodriguez et al. | | 382/103 |

(Continued)

OTHER PUBLICATIONS

Anindya Sarkar Efficient and Robust Detection of Duplicate Videos—IEEE transactions on circuits and systems for video tech vol. 20 No. 6 Jun. 2010.*

(Continued)

*Primary Examiner* — Chan Park
*Assistant Examiner* — Iman K Kholdebarin
(74) *Attorney, Agent, or Firm* — Schwegman Lundberg & Woessner, P.A.

(57) ABSTRACT

Methods and systems for searching for and retrieving video content via fingerprint matching are described. In some example embodiments, the methods and systems access an index of reference fingerprints, such as quantized values associated with multiple values calculated from patches of a frame, that are associated with sequential frames of known video content. The methods and systems may receive a search query that includes a group of query fingerprints associated with sequential frames of video content presented at a client device, access the index, compare the group of query fingerprints to reference fingerprints of the index, determine that the group of query fingerprints match the reference fingerprints of the index, and identify the video content presented at the client device based on the determined match.

12 Claims, 10 Drawing Sheets

(56) References Cited

U.S. PATENT DOCUMENTS

2013/0054645 A1* 2/2013 Bhagavathy et al. ......... 707/780
2013/0208942 A1* 8/2013 Davis ............................ 382/100

OTHER PUBLICATIONS

"DIVAS (Direct Video & Audio Content Search Engine)", Information Society. Networked Audio-Visual Systems, (Jan. 1, 2007), 3 pgs.

Joly, Alexis, "Statistical similarity search applied to content-based video copy detection", (2005), 10 pgs.

Lefebvre, Federic, et al., "Image and Video Fingerprinting: Forensic Applications", Media Forensics and Security From Conference vol. 7254, (Feb. 4, 2009), 9 pgs.

Roopalakshmi, R., "A Novel Approach to Video Copy Detection Using Audio Fingerprints and PCA", Procedia Computer Science, (2011), 149-156.

Sarkar, Anindya, et al., "Video Fingerprinting: Features for Duplicate and Similar Video Detection and Query-based Video Retrieval", Multimedia Content Access: Algorithms and Systems II, San Jose, California, (Jan. 2008), 12 pgs.

* cited by examiner

SEARCH AND IDENTIFICATION OF VIDEO CONTENT

CROSS REFERENCE TO RELATED APPLICATIONS

This application claims priority to U.S. Provisional Patent Application No. 61/749,819, filed on Jan. 7, 2013, entitled SEARCH AND IDENTIFICATION OF VIDEO CONTENT, which is hereby incorporated by reference in its entirety.

TECHNICAL FIELD

The subject matter disclosed herein generally relates to the processing of data. Specifically, the present disclosure addresses systems and methods to search for, identify, and/or retrieve video content.

BACKGROUND

Typically, people watch video content, such as television shows, advertisements, movies, video clips, and so on, via devices that receive a transmission from a content source. For example, a broadcaster (e.g., HBO® or CNN®), a web server (e.g., YouTube®), a peer-to-peer source (e.g., another device), and so on, streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Overview

Example methods and systems for searching for and identifying video content via fingerprint matching are described. In some example embodiments, the methods and systems access an index of reference fingerprints (e.g., quantized values associated with multiple values calculated from patches of a frame) that are associated with sequential frames of known video content, such as content presented by a television channel over a certain time period.

The methods and systems may receive a search query that includes a group of query fingerprints associated with sequential frames of video content presented at a client device, access the index, compare the group of query fingerprints to reference fingerprints of the index, determine that the group of query fingerprints match the reference fingerprints of the index, and identify the video content presented at the client device based on the determined match.

In some example embodiments, the methods and systems may determine a group of query fingerprints match reference fingerprints by identifying match candidates that satisfy the received search query, applying a selection heuristic (e.g., quality of match, quantify of fingerprint matches, information associated with the video content at the client device, and so on) to the match candidates, and selecting a match candidate based on the applied selection heuristic.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
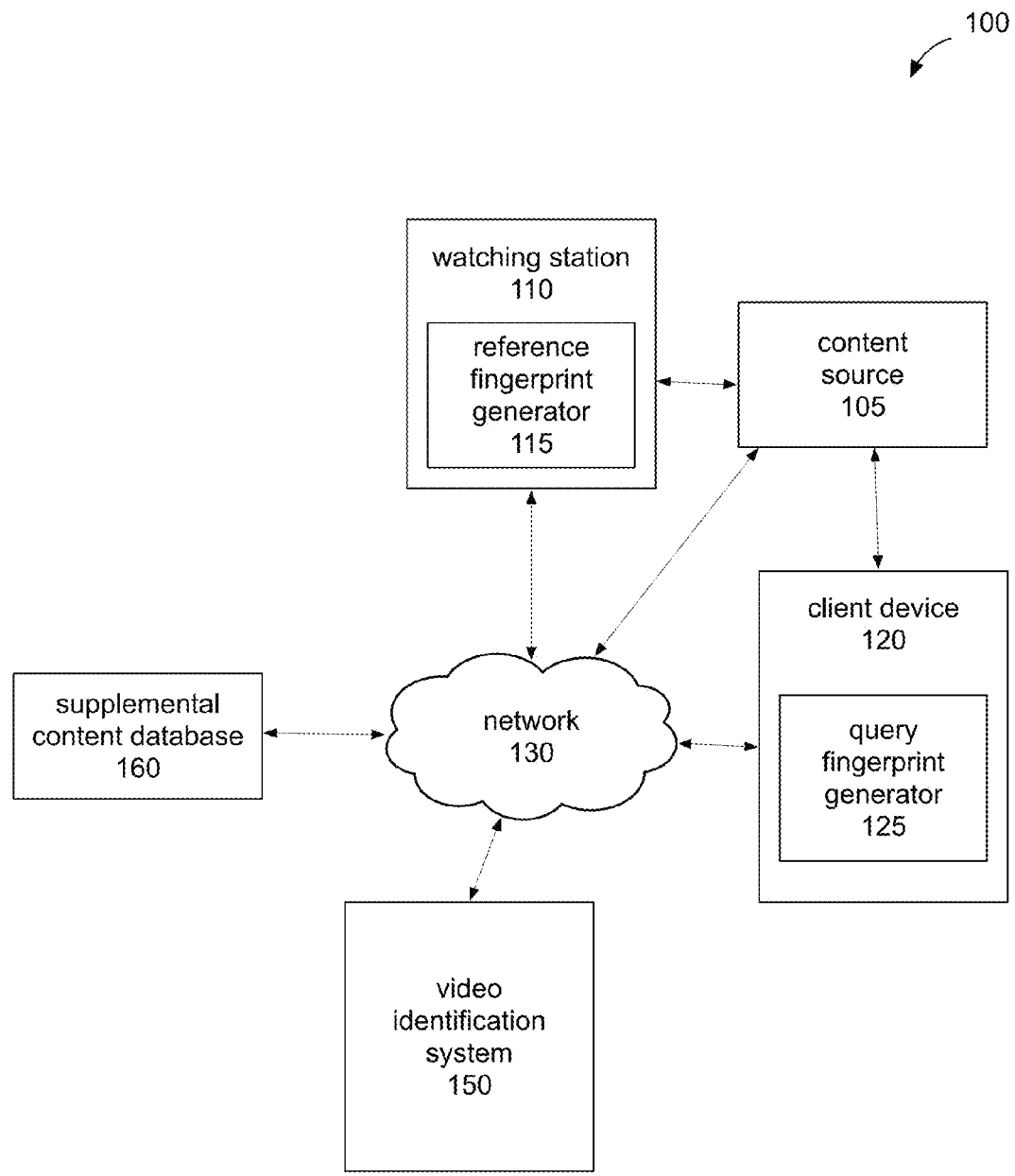
FIG. 1 is a network diagram illustrating a network environment suitable for identifying video content via fingerprint matching, according to some example embodiments.

FIG. 1 is a network diagram illustrating a network environment 100 suitable for searching for and retrieving video content, according to some example embodiments.

The network environment 100 may include a watching station 110 that receives video and other multimedia content from a content source 105, such as a broadcaster, web server, and so on. For example, the content source 105 may be a broadcaster, such as television station or television network, which streams or transmits media over a television channel to the watching station 110, and/or a web service, such as a website, that streams or transmits media over a network 130 to the watching station, among other things. The watching station 110 includes a reference fingerprint generator 115 that determines and/or calculates reference fingerprints of video content received from the content source 105.

The reference fingerprint generator 115 may determine and/or calculate reference fingerprints for some or all frames of video content provided by the content source 105 within a certain period of time, such as an hour, day, week, programming block, and so on. For example, the reference fingerprint generator 115 may determine reference fingerprints for all video content presented by a broadcaster on a channel associated with the broadcaster and/or for all broadcasters over all channels that provide content via multichannel distributors (e.g., cable, satellite, and/or Internet systems) or other content distributors.

One or more client devices 120 may receive the video and other multimedia content from the content source 105, such as via a broadcast channel and/or over the network 130. The client devices 120 may include televisions, set-top boxes, laptops and other personal computers, tablets and other mobile devices, gaming devices, and other devices capable of receiving and presenting a stream of video and/or other multimedia content.

In some example embodiments, the client device 120 may include a tuner configured to receive a stream of video content and play the stream of video content by processing the stream and outputting information (e.g., digital or analog) usable by a display of the client device 120 to present the video content to a user associated with the client device 120. The client device 120 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on.

The network 130 may be any network that enables communication between devices, such as a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

In some example embodiments, a video identification system 150 communicates with the watching station 110 and the client device 120 over the network 130. The video identification system 150 may receive and/or access a query fingerprint generated by the query fingerprint generator 125 of the client device 120, such as a fingerprint or fingerprints of a frame or block of frames within the video content, and query a database or index of known reference fingerprints generated by the reference fingerprint generator 115 of the watching station 110, in order to identify the video content by matching the query fingerprint with one or more reference fingerprints.

In some example embodiments, the video identification system 150 may receive a search query that includes multiple query fingerprints, such as a group of fingerprints associated with a sequence of frames of video content presented at the client device 120, and perform a search query to identify the presented video content using the group of query fingerprints. For example, the video identification system 150 may attempt to match two or more query fingerprints generated by the query fingerprint generator 125 to two or more reference fingerprints generated by the reference fingerprint generator 115.

In some example embodiments, when query results in an identification of multiple match candidates, the video identification system 150 may apply filters, heuristics, or other constraints, in order to identify a single or desired match candidate as the result of a query. Further details regarding the searching for and retrieving of video content are described herein.

Upon identifying the video content, the video identification system 150 may return an identifier for supplemental content (e.g., metadata, event-based information, and so on), such as content contained in a supplemental content database 160, associated with the video content to the client device 120. Using the identifier, the client device 120 may access the supplemental content from the database 160 and present the supplemental content along with playing video content, among other things. For example the client device 120 may access and present supplemental content from the database 160, such as listing or guide information for a broadcast channel, metadata associated with playing video content, information associated with playing video content, and so on.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the video identification system 150 may include the query fingerprint generator 125, frames of video content from the client device 120, and generate the query fingerprints using the included query fingerprint generator 125, among other configurations.

Examples of Searching for and Identifying Video Content

Figure 2:
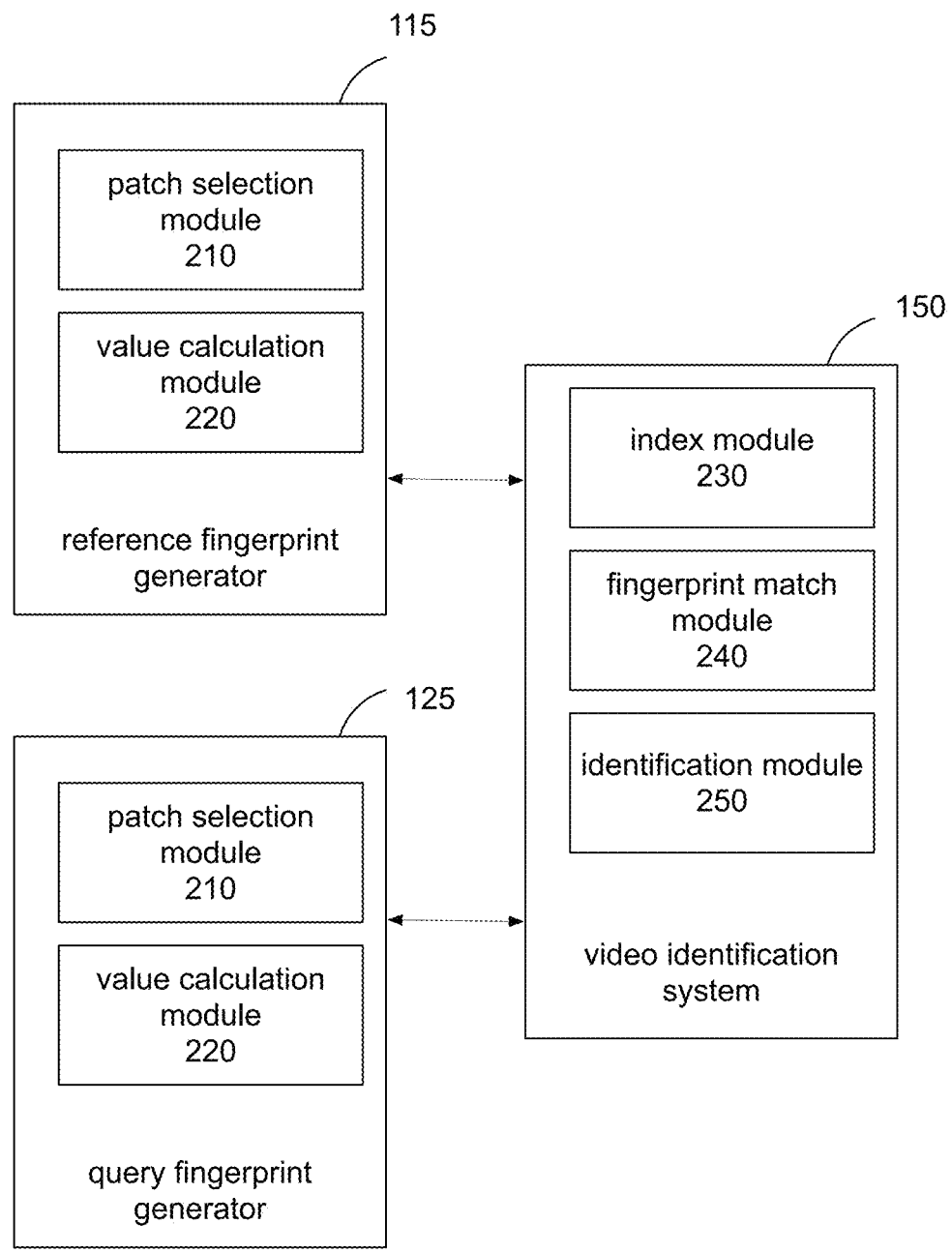
FIG. 2 is a block diagram illustrating components of a video identification system and a query fingerprint generator, according to some example embodiments.

As described herein, in some example embodiments, the systems and methods described herein utilize fingerprints of video content to identify the video content. FIG. 2 is a block diagram illustrating components of the video identification system 150 and the query fingerprint generator 125 or the reference fingerprint generator 115, according to some example embodiments.

The query fingerprint generator 125 of the client device 120 (or, the reference fingerprint generator 115 of the watching station 110) includes a patch selection module 210 and a value calculation module 220, all configured to communicate with each other (e.g., via a bus, shared memory, or a switch). The video identification system 150 includes an index module 230, a fingerprint match module 240, and an identification module 250, all configured to communicate with each other (e.g., via a bus, shared memory, or a switch).

One or more of the modules described herein may be implemented using hardware (e.g., a processor of a machine) or a combination of hardware and software. Moreover, any two or more of these modules may be combined into a single module, and the functions described herein for a single module may be subdivided among multiple modules.

In some example embodiments, the reference fingerprint generator and/or the query fingerprint generator 125 is configured and/or programmed to generate a query fingerprint of one or more frames of video content captured at the client device 120. For example, the reference fingerprint generator 115 or the query fingerprint generator 125 may calculate values of patches, such as Haar-like features, regions, portions, and/or other aspects of one or more frames within the video content. A patch may be a portion of a frame having various different geometries, a Haar-like feature, and so on. In some example embodiments, some or all captured patches may each have a different scale and be at a different location within a frame, among other things.

The query fingerprint generator 125 and/or the reference fingerprint generator 115 determine and/or calculates fingerprints for identifying video content from frames within the content. Typically, video content received by the watching station 110 or the client device 120 with be in various formats and sample rates, and the reference fingerprint generator 115 and/or query fingerprint generator 125 determines and/or calculates, for some or all of the frames of the video content, a fingerprint for each frame that is scale independent and robust to different compression artifacts, among other things. For example, the reference fingerprint generator 115 may calculate reference fingerprints at a certain frame rate, such as 5 frames per second, while the query fingerprint generator 125 may calculate query fingerprints at a different frame rate, such as 15 or 30 frames per second. The rates of calculation may be determined for a variety of reasons, such as to provide a robust index of fingerprints, to facilitate quick retrieval, and so on.

In some example embodiments, the query fingerprint generator 125 may combine the query fingerprints of each of the frames, such as sequential frames, to generate a search query that includes a group of fingerprints associated with a block of frames (e.g., multiple frames) of the video content.

The query fingerprint generator 125 and/or the reference fingerprint generator 115 may include a patch selection module 210 configured and/or programmed to select multiple patches of the video content, such as patches associated with a displayed region of a frame or frames within the video content.

The query fingerprint generator 125 and/or the reference fingerprint generator 115 may also include a value calculation module 220 configured and/programmed to calculate a value for each of the selected multiple patches using an integral image technique, such as a technique that calculates the values using a summed area table or other data structure that generates a sum of values in a rectangular area of a region.

For example, the patch selection module 210 may select patches, such as Haar-like features that are commonly used in object detection, of regions of a frame or frames. The value calculation module 220 may utilize the Haar-like features to generate and/or calculate a same value for objects in a frame, such as objects in a visual image of a frame), regardless of the relative size of the object. For example, the value calculation module 220 may generate values by approximating Gaussian filters and their derivatives using a box filter (e.g., an average of a region of the frame), wherein derivatives of the Gaussian filters are created by finding the differences in the box filters.

The query fingerprint generator 125 and/or the reference fingerprint generator 115, via the value calculation module 220, may determine and/or calculate a fingerprint by calculating the values of Haar-like features, or patches, at different scales and in different locations of displayed regions of the frames of video content.

Figure 3A:
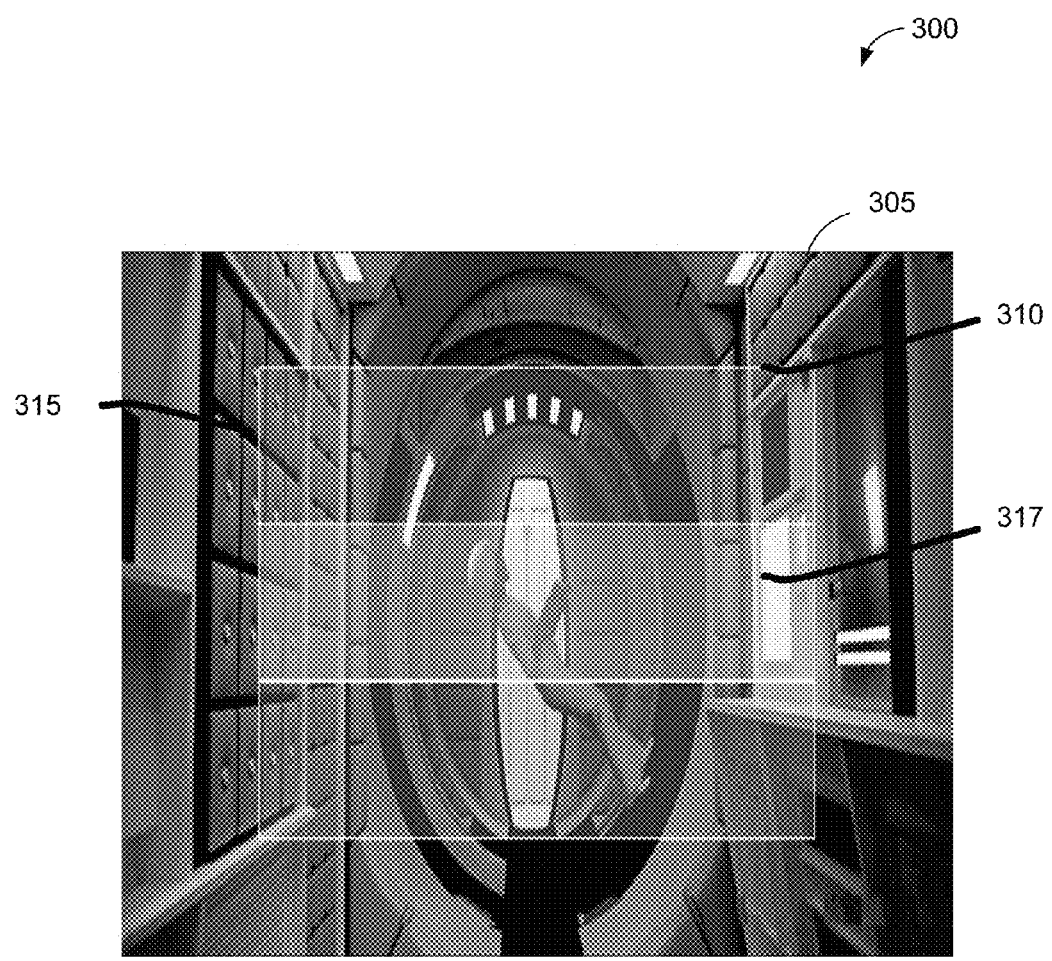
FIGS. 3A-3B are display diagrams illustrating patches applied to a frame of video content.

FIG. 3A is a display diagram 300 illustrating a first patch 310 applied to a frame 305 of video content. The patch 310 includes a middle region 317 and outer regions 315. The value calculation module 220 may calculate a value of the patch 310 by subtracting the middle region 317 from the outer regions 315, in order to determine what region of the patch 310 has a higher amount of energy.

Figure 3B:
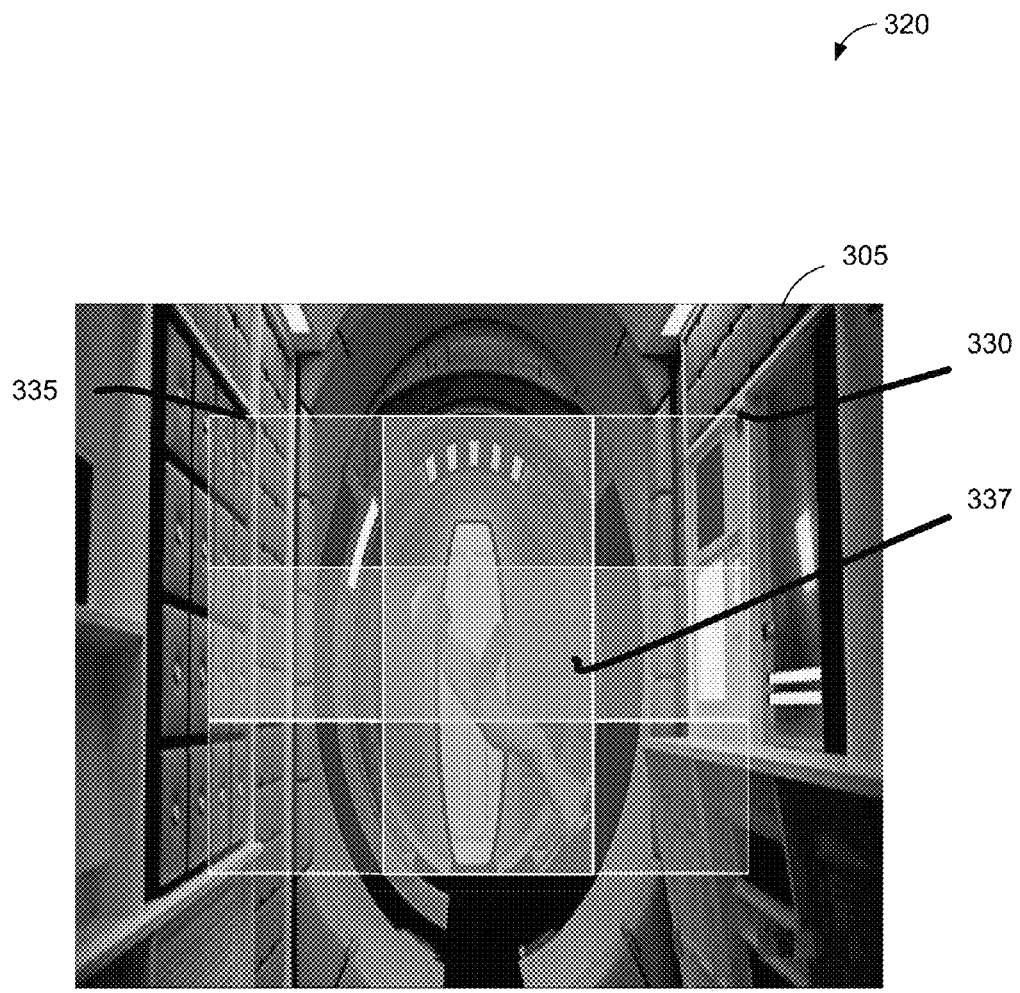

FIG. 3B is a display diagram 320 illustrating a second, different, patch 330 applied to a frame 305 of video content. The patch 330 includes a middle region 337 and outer regions 335. The value calculation module 220 may calculate a value of the patch 330 by subtracting the middle region 337 from the outer regions 335, in order to determine what region of the patch 330 has a higher amount of energy.

In some example embodiments, the patch selection module 210 selects 32 patches, which include 4 patches for the first 4 regions of a frame or 8 patches for the first 8 regions of a frame (e.g., the larger regions of a frame), and 24 other patches of the left-right and top-bottom features of each region of the frame that results when the frame is divided into a 4×3 grid of 12 regions. Of course, the patch selection module 210 may select a different number of patches or a different configuration of patches. For example, the patch selection module 210 may select the larger regions of a frame (e.g., the first 4 regions of a frame and/or 3-5 large regions of a frame) in order to calculate a first value, and select the smaller regions (the remaining regions) in order to calculate a second value, among other things.

In some example embodiments, the value calculation module 220 calculates a query or reference fingerprint by utilizing integral image techniques. For example, the value calculation module 220 may calculate an integral image, which is a summed image where each pixel is a cumulation of values of the pixels above and to the left, as well as the current pixel. The integral image technique may enable an efficient creation of a fingerprint once an integral image is created, among other benefits. Further efficiencies may be realized by using Integrated Performance Primitive (IPP) libraries (created by Intel®), to create the integral image, and/or by skipping columns and/or rows while generating the integral image in order to process smaller amounts of data, among other things.

Using the integral images, the value calculation module 220 may then calculate values for multiple regions or patches of a frame, such as by using the following formula:

$$FP(i,j,w,h) = I_{int}(i,j) - I_{int}(i+w,j) - I_{int}(i,j+h) + I_{int}(i+w,j+h).$$

In this example, the value calculation module 220 calculates values for the patches or regions of a frame as 16-bit integers, because the range is [−255, 255], which is outside the range of an 8-bit integer. Additionally, the calculated patches or regions of a frame may be weighted by their size, and the calculated values may be floating point values. To capture this information, the values for the fingerprint are scaled to a full 16-bit range. However, in some example embodiments, the values may be quantized to 8-bits, reducing the storage space of a generated fingerprint (e.g., from 64 bytes to 32 bytes), among other things. For example, when generating an index of reference fingerprints, the reference fingerprint generator 115 may calculate an integer, vector, or other value associated with 3-5 large regions (e.g., the 4 first regions) of a frame.

Figure 4:
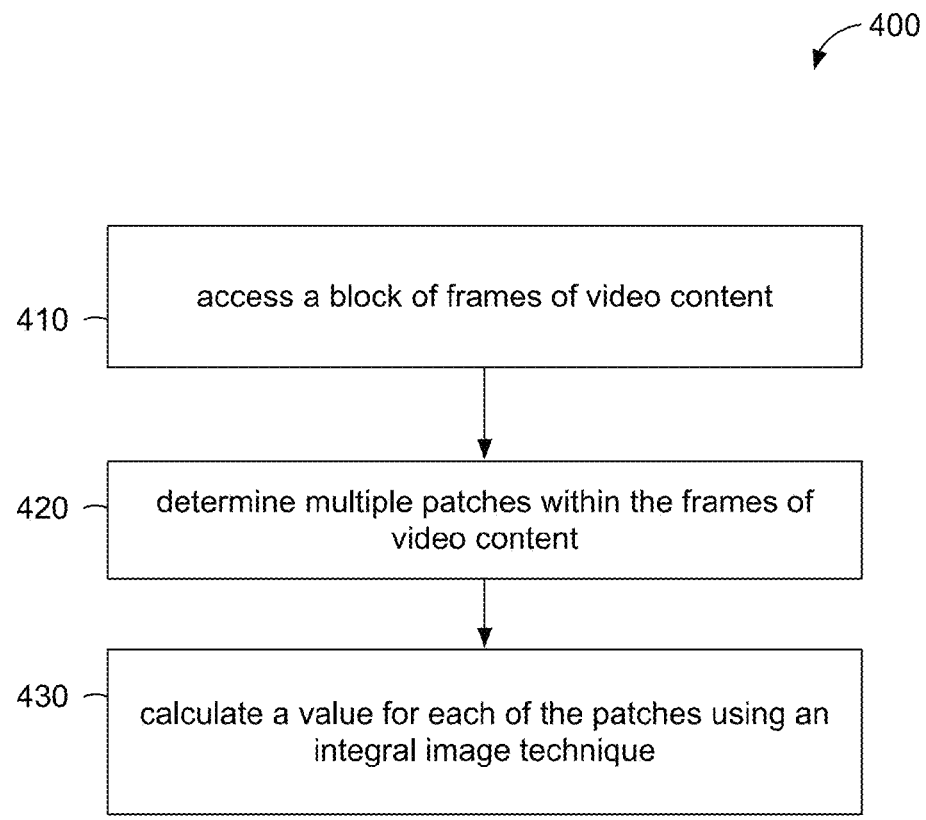
FIG. 4 is a flow diagram illustrating an example method for generating a fingerprint, according to some example embodiments.

FIG. 4 is a flow diagram illustrating an example method 400 for determining and/or calculating a fingerprint, such as a reference or query fingerprint, according to some example embodiments. The method 400 may be performed by the query fingerprint generator 125 and/or the reference fingerprint generator 115 and, accordingly, is described herein merely by way of reference thereto. It will be appreciated that the method 400 may be performed on any suitable hardware.

In operation 410, the reference fingerprint generator 115 or the query fingerprint generator 125 accesses a frame or block of frames of video content. For example, the query fingerprint generator 125 may access one or more frames of video content currently playing on the client device 120 or the reference fingerprint generator may access one or more frames of video content presented via the watching station 110.

In operation 420, the reference fingerprint generator 115 or the query fingerprint generator 125 selects multiple patches, of one or more frames of video content, that are associated with a displayed region of the video content. For example, the patch selection module 210 selects multiple patches (e.g., 3-5 patches, 4, patches, 32 patches, and so on) of regions of a displayed frame.

In operation 430, the reference fingerprint generator 115 or the query fingerprint generator 125 calculates a value for each of the selected multiple patches using an integral image technique. For example, the value calculation module 220 calculates a quantized value (e.g., an integer or vector) for each of the selected regions using the techniques described herein.

Thus, the query fingerprint generator 125 or the reference fingerprint generator 115 may generate a fingerprint for a single frame and/or a group of fingerprints for a block of frames of video content by selecting patches of regions (e.g. Haar-like features) of the frame or frames, calculating values for each of the selected patches, and performing integral image techniques to generate fingerprints using the calculated values for the selected patches, among other things.

Referring back to FIG. 2, the video identification system 150 includes the index module 230, the fingerprint match module 240, and the identification module 250, among other modules, which are configured and/or programmed to match a query fingerprint to a known reference fingerprint.

In some example embodiments, the index module 230 is configured and/or programmed to receive a search query that includes a group of query fingerprints associated with sequential frames of video content presented at the client device 120, and query an index of reference fingerprints that are associated with sequential frames of known video content, such as video content presented to the watching stations 110.

For example, the index module 230 may access and query a database or index of known reference fingerprints of video content captured at a reference device, such as an index generated and stored within a database of the watching station 110, an index generated and stored within the video identification system 150, an index generated and/or stored within the client device 120, and so on.

For example, the index module 230 may be configured to access and/or query an index of quantized patch values of the known reference fingerprints. The index module 230 may generate and perform queries of an index of 8-, 16-, and/or 24-bit numbers that are associated with single frames of the reference fingerprints. The index module 230 may derive the numbers by quantizing one or more patch values of the reference fingerprints, such as 3-5 patch values (e.g., 4 patch values).

The index module 230 may index some or all frames of the reference fingerprints using the best or better correlated values of large regions of the frames. The index module 230 may create an index using the best correlated values of the full frame patches, because the features associated with the best correlated values may represent the remaining patches of a frame, among other things.

For example, when three regions of a frame are the best correlated values, the index module 230 quantizes each of the three values to 8-bits, such as by placing them in an evenly spaced histogram with a maximum and minimum limit, creating a 24-bit number. The index module 230 may then utilize a reference fingerprint index of 24-bit numbers to quickly look up and/or identify frames, because there are only 81 permutations per index to parse when attempting to match fingerprints, among other things.

In some example embodiments, the fingerprint match module 240 is configured and/or programmed to determine that the group of query fingerprints match the reference fingerprints of the generated index.

For example, the fingerprint match module 240 may determine that a group of query fingerprints match known reference fingerprints upon determining that a similarity between each of the query fingerprints and each of the reference fingerprints satisfies a predetermined threshold associated with a Tanimoto distance measurement, a Manhattan distance measurement, and/or other distance measurements associated with matching images or other visual-based content.

For example, the fingerprint match module 240 may compare a query fingerprint to a reference fingerprint using the Tanimoto or the Manhattan distance measurements, and determine that the fingerprints match when the comparison indicates that the distance measurement satisfies a predetermined threshold (e.g., is within a certain distance threshold). Of course, the fingerprint match module 240 may utilize other matching techniques in order to determine whether a query fingerprint matches a reference fingerprint, such as Euclidean, Cosine, KL-Divergence and/or Itakura distance measurement techniques, among other distance measurement techniques.

In some example embodiments, the video identification system 150 may utilize various different block sizes (e.g., number of frames, or frame rate) of fingerprints when matching a group of query fingerprints to multiple reference fingerprints. For example, the reference fingerprint generator 115 may be set at 5 frames per second (fps), and occupy approximately 560 KB/h of runtime given an 8-bit value (32 bytes/frame) for the fingerprint, and the query fingerprint generator 125, which may include offset errors, may be set at 15 fps or higher. In this example, a query of the index may involve querying multiple reference frames (e.g., 3 frames for a reference fingerprint) of the reference fingerprint index, among other things.

Thus, in some example embodiments, the video identification system 150 may optimize a match rate for matching a query fingerprint to a reference fingerprint, by modifying the block sizes of the fingerprints. For example, the fingerprint match module 240 may match a query fingerprint to one second of reference video content, 0.5 second of reference video content, and so on.

In some example embodiments, the identification module 250 is configured and/or programmed to identify the video content presented at the client device based on the determined match. For example, the identification module 250 may identify video content captured at the client device 120 based on a determination that a group of query fingerprints matches multiple reference fingerprints. The identification module 250 may identify the name or title of the video content, a location within the video content currently being presented by the client device 120, a channel or broadcaster providing the video content, and so on.

Figure 5:
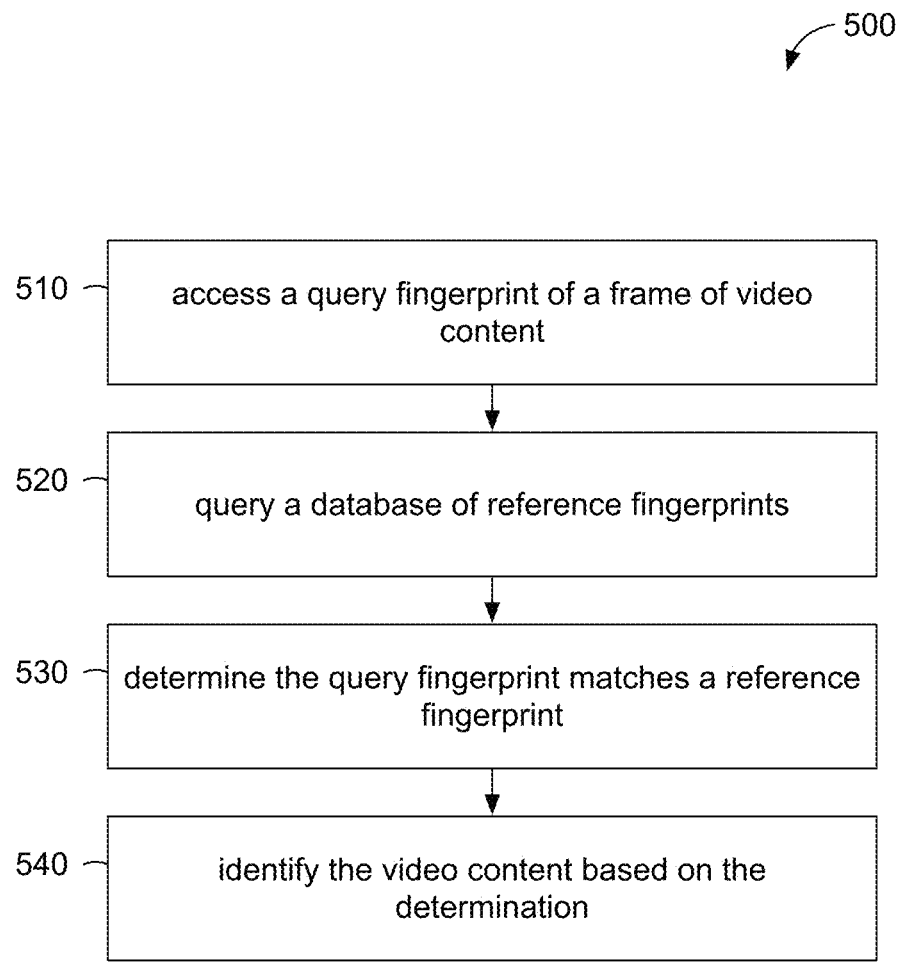
FIG. 5 is a flow diagram illustrating an example method for identifying video content, according to some example embodiments.

FIG. 5 is a flow diagram illustrating an example method 500 for identifying video content, according to some example embodiments. The method 500 may be performed by the video identification system 150 and, accordingly, is described herein merely by way of reference thereto. It will be appreciated that the method 500 may be performed on any suitable hardware.

In operation 510, the video identification system 150 accesses a query fingerprint of video content that is based on multiple patches of a frame of video content captured at a client device. For example, the video identification system 150 may access and/or receive a group of query fingerprints from the query fingerprint generator 125 of the client device 120.

In operation 520, the video identification system 150 queries a database of reference fingerprints associated with frames of known video content. For example, the index module 230 may query an index of quantized patch values of the known reference fingerprints.

In operation 530, the video identification system 150 determines the query fingerprint matches at least one of the reference fingerprints. For example, the fingerprint match module 240 may determine that a query fingerprint matches at least one known reference fingerprint by determining that a similarity between the query fingerprint and at least one of the query reference fingerprints satisfies a predetermined threshold associated with a Tanimoto distance measurement, a Manhattan distance measurement, and/or other distance measurements associated with matching images or other visual-based content.

Referring back to FIG. 5, in operation 540, the video identification system 150 identifies the video content captured at the client device based on the determination that the query fingerprint matches at least one of the reference fingerprints. For example, the identification module 250 may identify the name or title of the video content, such as the name of a movie, television program, video clip, video game, and so on.

In some example embodiments, and in response to identifying the video content, the video identification system 150 may return an identifier for supplemental content associated with the identified video content to the client device 120. The client device 120 may use the received identifier to access metadata, event-based content, and/or other supplemental information or content that is associated with the identified video content and/or associated with a time or location (e.g., a frame or block of frames) within the video content, that is currently being presented via the client device.

Figure 6:
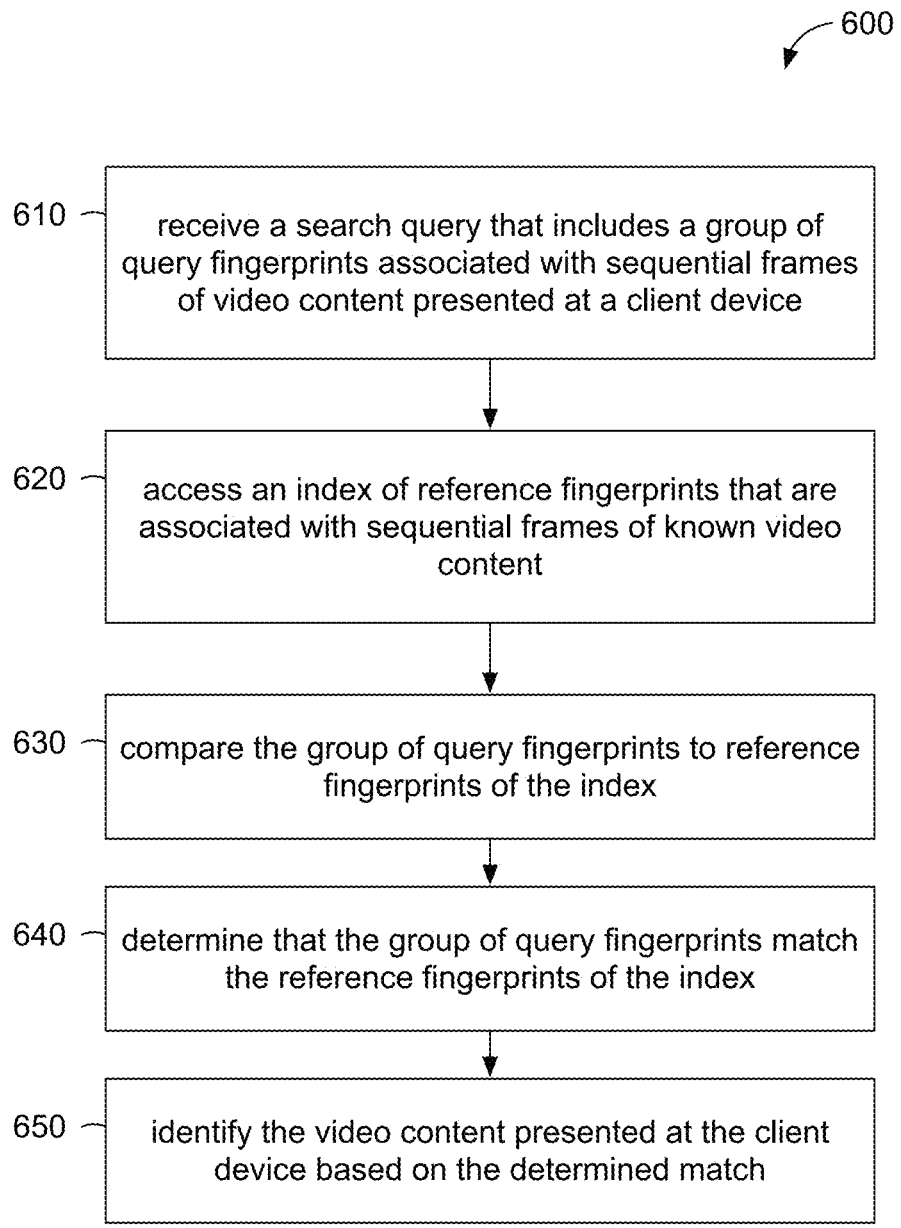
FIG. 6 is a flow diagram illustrating an example method for identifying video content that satisfies a search query of multiple query fingerprints, according to some example embodiments.

As described herein, in some example embodiments, the video identification system 150 may identify video content based on comparing multiple query fingerprints to multiple reference fingerprints, such as fingerprints of sequential frames within playing or presented video content, among other things. FIG. 6 is a flow diagram illustrating an example method 600 for identifying video content that satisfies a search query of multiple query fingerprints, according to some example embodiments. The method 600 may be performed by the video identification system 150 and, accordingly, is described herein merely by way of reference thereto. It will be appreciated that the method 600 may be performed on any suitable hardware.

In operation 610, the video identification system 150 receives a search query that includes a group of query fingerprints associated with sequential frames of video content presented at a client device. For example, the index module 230 may receive and/or access a search query that includes a group of query fingerprints for a sequence of frames currently playing or recently presented by the client device 120.

In operation 620, the video identification system 150 accesses an index of reference fingerprints that are associated with sequential frames of known video content. For example, the index module 230 may access an index of fingerprints that are each a quantized value associated with multiple patches of a frame of video content.

The index may include entries that relate integers or vectors made of up of some or all patches of a frame of video content to an identifier of the frame of video content. For example, the index may include integers associated with frames of video content, where an integer is calculated by hashing three to five different (e.g., four) Haar-like features of the frame of video content.

In operation 630, the video identification system 150 compares the group of query fingerprints to reference fingerprints of the index. For example, the fingerprint match module 240 may compare each of the query fingerprints reference fingerprints in order to match the group of query fingerprints to a group of reference fingerprints.

As described herein, in some example embodiments, the video identification system 150 may match, or attempt to match, a group of query fingerprints associated with a sequence of frames playing at the client device 120 to a group of reference fingerprints associated with a sequence of frames presented at the watching station 110, among other things. In some cases, a single query fingerprint may match many different reference fingerprints, such as reference fingerprints associated with frames that are proximate to one another in a block of frames, because many sequential frames display common or similar content, among other things.

Figure 7:
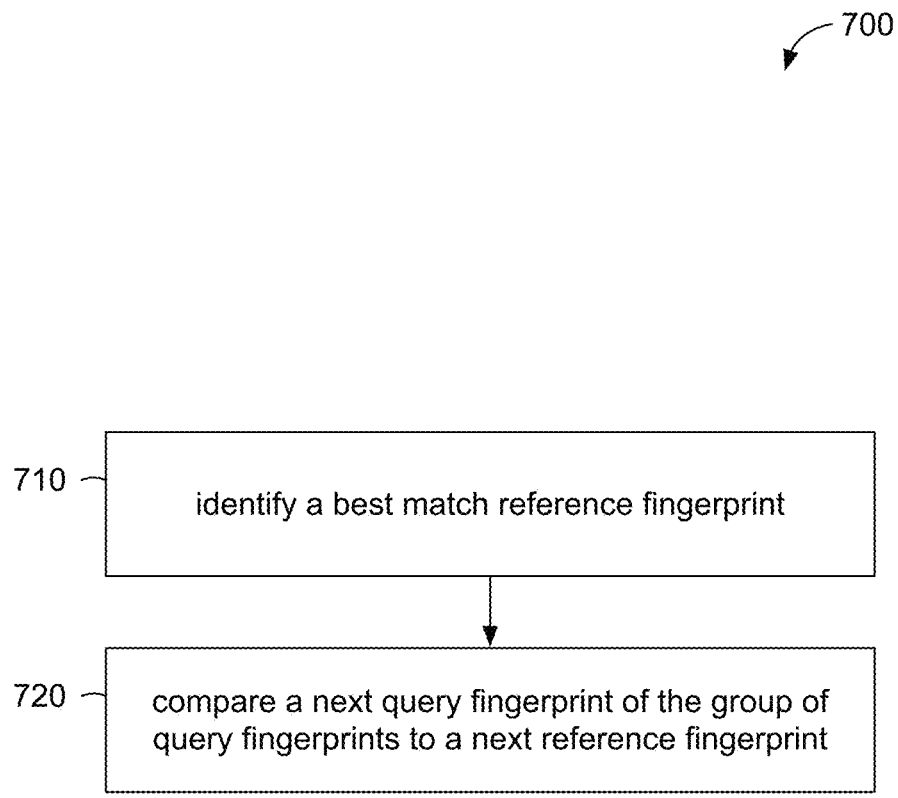
FIG. 7 is a flow diagram illustrating an example method for comparing a group of query fingerprints to a group of reference fingerprints, in some example embodiments.

FIG. 7 is a flow diagram illustrating an example method 700 for comparing a group of query fingerprints to a group of reference fingerprints, in some example embodiments. The method 700 may be performed by the video identification system 150 and, accordingly, is described herein merely by way of reference thereto. It will be appreciated that the method 700 may be performed on any suitable hardware.

In operation 710, the video identification system 150 identifies a best match reference fingerprint that best matches a first query fingerprint from the received search query. For example, the fingerprint match module 240 may identify a reference fingerprint as a best match fingerprint when the reference fingerprint has a high or highest match similarity with a first query fingerprint (e.g., a first fingerprint of a group of fingerprints associated with a sequence of frames of video content).

In operation 720, the video identification system 720 compares a next query fingerprint after the first query fingerprint of the group of query fingerprints from the received search query to a next reference fingerprint after the best match reference fingerprint. For example, the fingerprint match module 240 may orient a comparison of fingerprints by beginning a comparison between fingerprints at the best match reference fingerprint, and performing comparisons of subsequent query fingerprints to reference fingerprints, among other things.

Returning to FIG. 6, in operation 640, the video identification system 150 determines that the group of query fingerprints match the reference fingerprints of the index. For example, the fingerprint match module 240 may determine that a query fingerprint matches at least one known reference fingerprint by determining that a similarity between the query fingerprint and at least one of the query reference fingerprints satisfies a predetermined threshold associated with a Tanimoto distance measurement, a Manhattan distance measurement, and/or other distance measurements associated with matching images or other visual-based content described herein.

In some example embodiments, the fingerprint match module 240 may identify two or more match candidates based on a comparison of the group of query fingerprints to values associated with the reference fingerprints that are calculated from one or more large regions of the frames of known video content, and select one or more of the identified match candidates based on a comparison of the group of query fingerprints to values associated with the identified match candidates that are calculated from one or more small regions of the frames of known video content.

Figure 8:
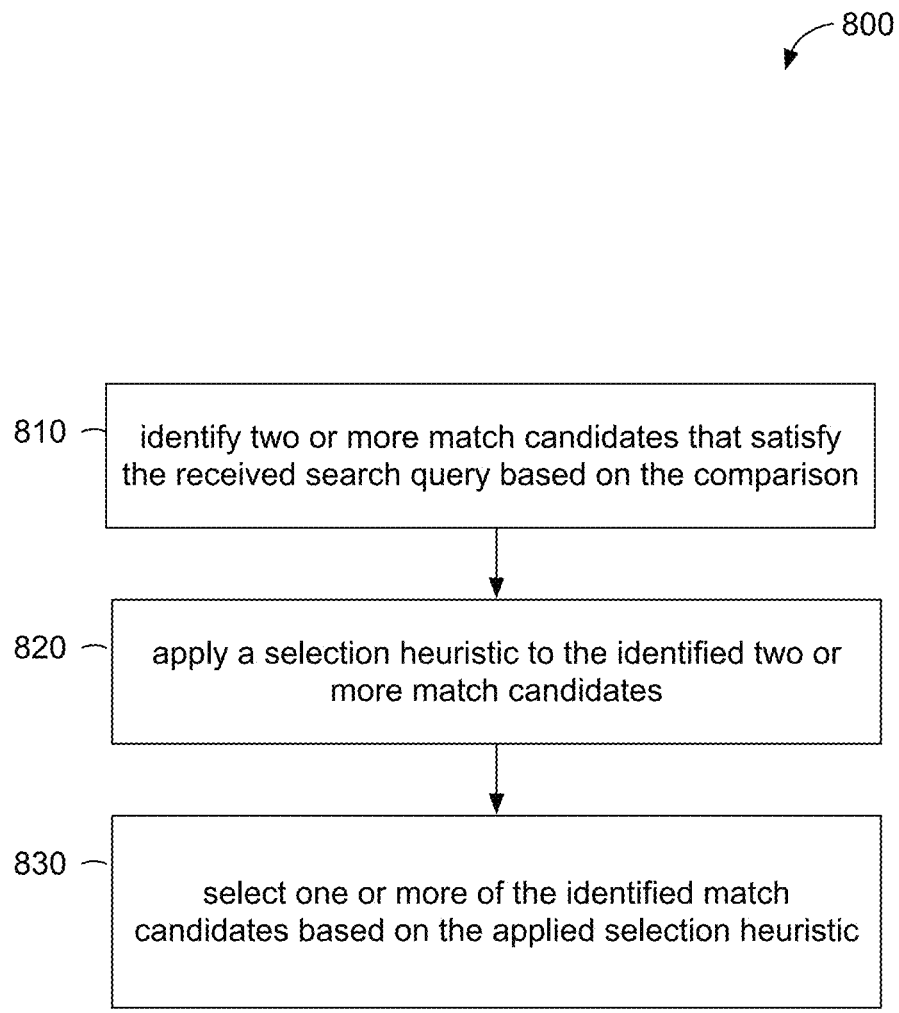
FIG. 8 is a flow diagram illustrating an example method for determining that a group of query fingerprints matches reference fingerprints, in some example embodiments.

FIG. 8 is a flow diagram illustrating an example method 800 for determining that a group of query fingerprints matches reference fingerprints, in some example embodiments. The method 800 may be performed by the video identification system 150 and, accordingly, is described herein merely by way of reference thereto. It will be appreciated that the method 800 may be performed on any suitable hardware.

In operation 810, the video identification system 150 identifies two or more match candidates that satisfy the received search query based on the comparison. For example, the fingerprint match module 240 may identify multiple different fingerprints representative of frames at various time periods within a sequence of video content (e.g., a week of video content presented by a television channel) as match candidates.

In operation 820, the video identification system 150 applies a selection heuristic to the identified two or more match candidates. For example, the fingerprint match module 150 applies one or more selection heuristics, constraints, filters, and/or other criteria in order to determine reduce or minimize the number of match candidates as actual matches.

Example heuristics or other criteria that may be applied include criteria associated with a quality of the match between a query fingerprint and a reference fingerprint, criteria associated with a number of matches between query fingerprints of a group of query fingerprints and reference fingerprints of a group of reference fingerprints, criteria associated with a time period at which frames associated with the fingerprints were presented, criteria associated with viewing characteristics (e.g., indications of a switch of channels) associated with frames presented at the client device 120, criteria associated with previous queries for video content, combinations thereof, and so on.

In operation 830, the video identification system 150 selects one or more of the identified match candidates based on the applied selection heuristic. For example, the fingerprint match module 240 may select one of the reference fingerprint match candidates as a likely match based on the reference fingerprints having the highest match quality, based on the reference fingerprints being associated with frames of video content presented at the watching station 110 at a most recent time period, and so on.

Returning to FIG. 6, in operation 650, the video identification system 150 identifies the video content presented at the client device based on the determined match. For example, the identification module 250 may identify the name or title of the video content, such as the name of a movie, television program, video clip, video game, and so on.

As described herein, in some example embodiments, and in response to identifying the video content, the video identification system 150 may return an identifier for supplemental content associated with the identified video content to the client device 120. The client device 120 may use the received identifier to access metadata, event-based content, and/or other supplemental information or content that is associated with the identified video content and/or associated with a time or location (e.g., a frame or block of frames) within the video content, that is currently being presented via the client device.

Thus, in some example embodiments, the video identification system 150 may efficiently search for and identify video content playing at a client by performing queries of known video content using two or more fingerprints on indices of known video content, such as indices that relate quantized values to frames of known video content. For example, the video identification system 150 may access and perform a query of an index that relates a first set of values (e.g. values associated with a few large regions of frames) to frames in order to identify a set of match candidate fingerprints, and then perform a query of a second set of values (e.g., values associated with smaller regions of frames) associated with the match candidate fingerprints in order to select an actual or likely reference fingerprint match, among other things.

Figure 9:
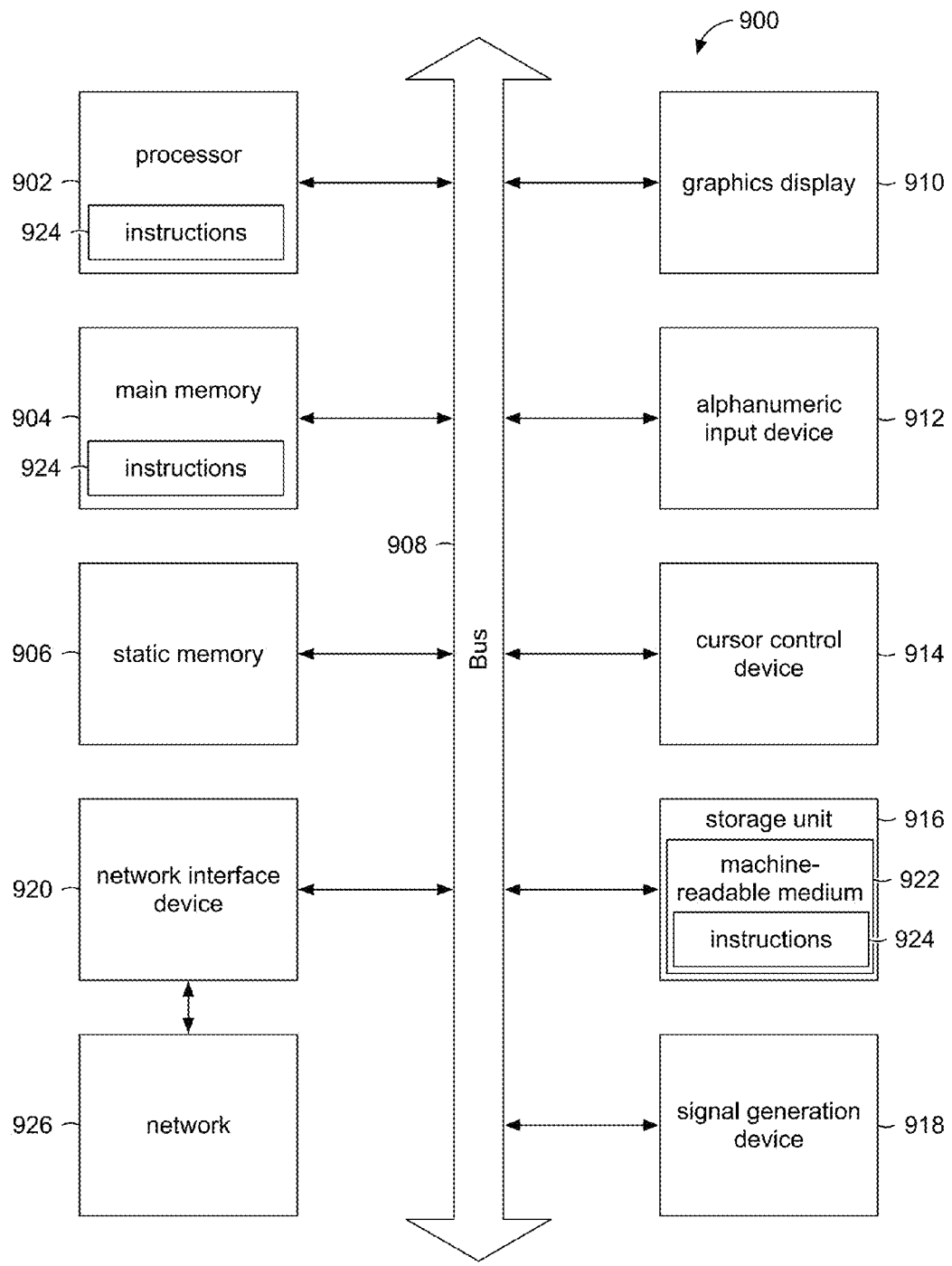
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, an STB, a PDA, a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), an LED display, an LCD, a projector, or a CRT). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., software) for execution by the machine (e.g., machine 900), such that the instructions, when executed by one or more processors of the machine (e.g., processor 902), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
receiving a search query that includes a group of query fingerprints, each fingerprint of the group of query fingerprints being associated with a frame of video content presented at a client device, the frames of video content associated with the group of query fingerprints being sequential;
accessing an index of reference fingerprints, each reference fingerprint of the reference fingerprints corresponding to a sequential frame of known video content, each reference fingerprint of the reference fingerprints having an associated first value calculated from one or more large regions of the corresponding frame of known video content, each reference fingerprint of the reference fingerprints having an associated second value calculated from one or more small regions of the corresponding frame of known video content;
comparing the group of query fingerprints to reference fingerprints of the index;
identifying two or more match candidates based on a comparison of the group of query fingerprints to the first values associated with the reference fingerprints;
selecting one or more of the identified match candidates based on a comparison of the group of query fingerprints to the second values associated with the identified match candidates; and
identifying the video content presented at the client device based on the selected match candidates.

2. The method of claim 1, wherein accessing an index of reference fingerprints that are associated with sequential frames of known video content includes accessing an index of quantized values for each of the sequential frames of known video content.

3. The method of claim 1, wherein accessing an index of reference fingerprints that are associated with sequential frames of known video content includes accessing an index of 32 bit vectors associated with one or more different patches of a frame of video content.

4. The method of claim 1, wherein accessing an index of reference fingerprints that are associated with sequential frames of known video content includes accessing an index of integers associated with frames of video content, an integer being calculated by hashing three to five different Haar-like features of the frame of video content.

5. The method of claim 1, wherein accessing an index of reference fingerprints that are associated with sequential frames of known video content includes accessing an index of integers associated with a frame of video content, an integer being calculated by hashing a first four Haar-like features of the frame of video content.

6. The method of claim 1, wherein accessing an index of reference fingerprints includes accessing an index of reference fingerprints associated with frames of video content at a first frame rate;
wherein receiving a search query includes a receiving a group of query fingerprints presented at a client device having a second frame rate faster than the first frame rate; and
wherein comparing the group of query fingerprints to the reference fingerprints of the index includes comparing a portion of query fingerprints having the second frame rate to the reference fingerprints associated with frames of video content at the first frame rate.

7. A system, comprising:
a processor-implemented index module that is configured to:
receive a search query that includes a group of query fingerprints, each fingerprint of the group of query fingerprints being associated with a frame of video content presented at a client device, the frames of video content associated with the group of query finger prints being sequential, and
query an index of reference fingerprints, each reference fingerprint of the reference fingerprints corresponding to a sequential frame of known video content, each reference fingerprint of the reference fingerprints having an associated first value calculated from one or more large regions of the corresponding frame of known video content, each reference fingerprint of the reference fingerprints having an associated second value calculated from one or more small regions of the corresponding frame of known video content;
a fingerprint match module that is configured to:
identify two or more match candidates based on a comparison of the group of query fingerprints to the first values associated with the reference fingerprints,
select one or more match candidates based on a comparison of the group of query fingerprints to the first values associated with the reference fingerprints, and
an identification module that is configured to identify the video content presented at the client device based on the selected match candidates.

8. The system of claim 7, wherein the index module is configured to query an index of quantized values for each of the sequential frames of known video content.

9. The system of claim 7, wherein the index module is configured to query an index of 32 bit vectors associated with 32 different patches of a frame of video content.

10. The system of claim 7, wherein the index module is configured to query an index of integers associated with frames of video content, an integer being calculated by hashing a first four Haar-like features of the frame of video content.

11. The system of claim 7, wherein the index module is configured to query an index of integers associated with frames of video content, an integer being calculated by hashing three to five different Haar-like features of the frame of video content.

12. A non-transitory computer-readable storage medium whose contents, when executed by a computing system, cause the computing system to perform operations, comprising:
receiving a search query that includes a group of query fingerprints, each fingerprint of the group of query fingerprints being associated with a frame of video content presented at a client device, the frames of video content associated with the group of query fingerprints being sequential;
accessing an index of reference fingerprints, each reference fingerprint of the reference fingerprints corresponding to a sequential frame of known video content, each reference fingerprint of the reference fingerprints having an associated first value calculated from one or more large regions of the corresponding frame of known video content, each reference fingerprint of the reference fingerprints having an associated second value calculated from one or more small regions of the corresponding frame of known video content;

comparing the group of query fingerprints to reference fingerprints of the index;

identifying two or more match candidates based on a comparison of the group of query fingerprints to the first values associated with the reference fingerprints;

selecting one or more of the identified match candidates based on a comparison of the group of query fingerprints to the second values associated with the identified match candidates; and identifying the video content presented at the client device based on the selected match candidates.

* * * * *